United States Patent
Hutchison et al.

(10) Patent No.: US 7,814,329 B1
(45) Date of Patent: Oct. 12, 2010

(54) MACSEC IMPLEMENTATION

(75) Inventors: Guy T. Hutchison, Santa Clara, CA (US); Awais B. Nemat, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 1208 days.

(21) Appl. No.: 11/400,600

(22) Filed: Apr. 7, 2006

(51) Int. Cl.
*H04L 9/00* (2006.01)
*H04L 9/32* (2006.01)
*G06F 13/10* (2006.01)

(52) U.S. Cl. .................. 713/181; 713/320; 713/323; 713/324

(58) Field of Classification Search ........... 713/181, 713/320, 323, 324
See application file for complete search history.

(56) References Cited

U.S. PATENT DOCUMENTS

| | | | |
|---|---|---|---|
| 6,260,150 B1 * | 7/2001 | Diepstraten et al. | 713/323 |
| 6,775,764 B1 * | 8/2004 | Batcher | 712/227 |
| 7,073,079 B1 * | 7/2006 | Karsi et al. | 713/320 |
| 7,281,230 B2 * | 10/2007 | Chung et al. | 716/11 |
| 7,334,086 B2 * | 2/2008 | Hass et al. | 711/123 |
| 2004/0143734 A1 * | 7/2004 | Buer et al. | 713/153 |
| 2004/0151149 A1 * | 8/2004 | Song et al. | 370/338 |
| 2006/0136715 A1 * | 6/2006 | Han et al. | 713/151 |

OTHER PUBLICATIONS

The Design and Implementation of MAC Security in EPON, Feb. 2006.*
IEEE P802.1AE/D5.0; Draft Standard for Local and Metropolitan Area Networks—Media Access Control (MAC) Security; Security Task Group of IEEE 802.1; Nov. 16, 2005; 148 pages.

* cited by examiner

*Primary Examiner*—Kambiz Zand
*Assistant Examiner*—William S Powers

(57) ABSTRACT

A method and apparatus for performing MAC security (MACSec) operations. In one embodiment, the apparatus comprises a plurality of discrete elements coupled together to perform MAC security processing, the plurality of discrete elements able to operate on distinct packets related to MAC security simultaneously, and wherein each of the plurality of discrete elements is in an independently controlled power domain that enters a reduced power consumption state independently of other discrete elements in the plurality of discrete elements when not in use.

19 Claims, 7 Drawing Sheets

BASIC AUTH CALCULATION AND INSERT

AUTH CALCULATION - PARALLEL BUFFER TECHNIQUE

AUTH CALCULATION - SEQUENTIAL BUFFER TECHNIQUE

MACSEC IMPLEMENTATION

FIELD OF THE INVENTION

The present invention relates to the field of communication security; more particularly, the present invention relates to MAC Ethernet security processing with reduced power consumption in a network environment.

BACKGROUND OF THE INVENTION

Today, companies apply multiple forms of security to protect network functions, including data and applications. The IEEE 802.1 SECURITY TASK GROUP is developing protocols to secure local area networks (LANs). One set of protocols is referred to as IEEE 802.1AE MEDIA ACCESS CONTROL SECURITY (MACSec). MACSec integrates security protection into wired Ethernet to secure LANs from security breaches. Such protection extends to passive wiretapping, man in the middle and denial of service attacks. In so doing so, the IEEE 802.1AE Standard helps avoid disruption to Ethernet networks by protecting LAN devices from unauthorized communication.

MACSec will be used in environments where the size and power dissipation of security processing elements is a design concern. Security processing may constitute a large portion of a chip die, as well as a disproportionately large portion of the chip power dissipation. Power dissipation consists of two components, dynamic power consumption and leakage power. Dynamic power consumption is due to clock tree dissipation and transition propagation.

With die size being a premium in today's markets and power consumption being such a big concern, particularly in today's mobile environments, a MACSec design is desired that enables processing of packets to occur quickly, while reducing overall power consumption.

SUMMARY OF THE INVENTION

A method and apparatus for performing MAC security (MACSec) operations. In one embodiment, the apparatus comprises a plurality of discrete elements coupled together to perform MAC security processing, the plurality of discrete elements able to operate on distinct packets or parts of packets related to MAC security simultaneously, and wherein each of the plurality of discrete elements is in an independently controlled power domain that enters a reduced power consumption state independently of other discrete elements in the plurality of discrete elements when not in use.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
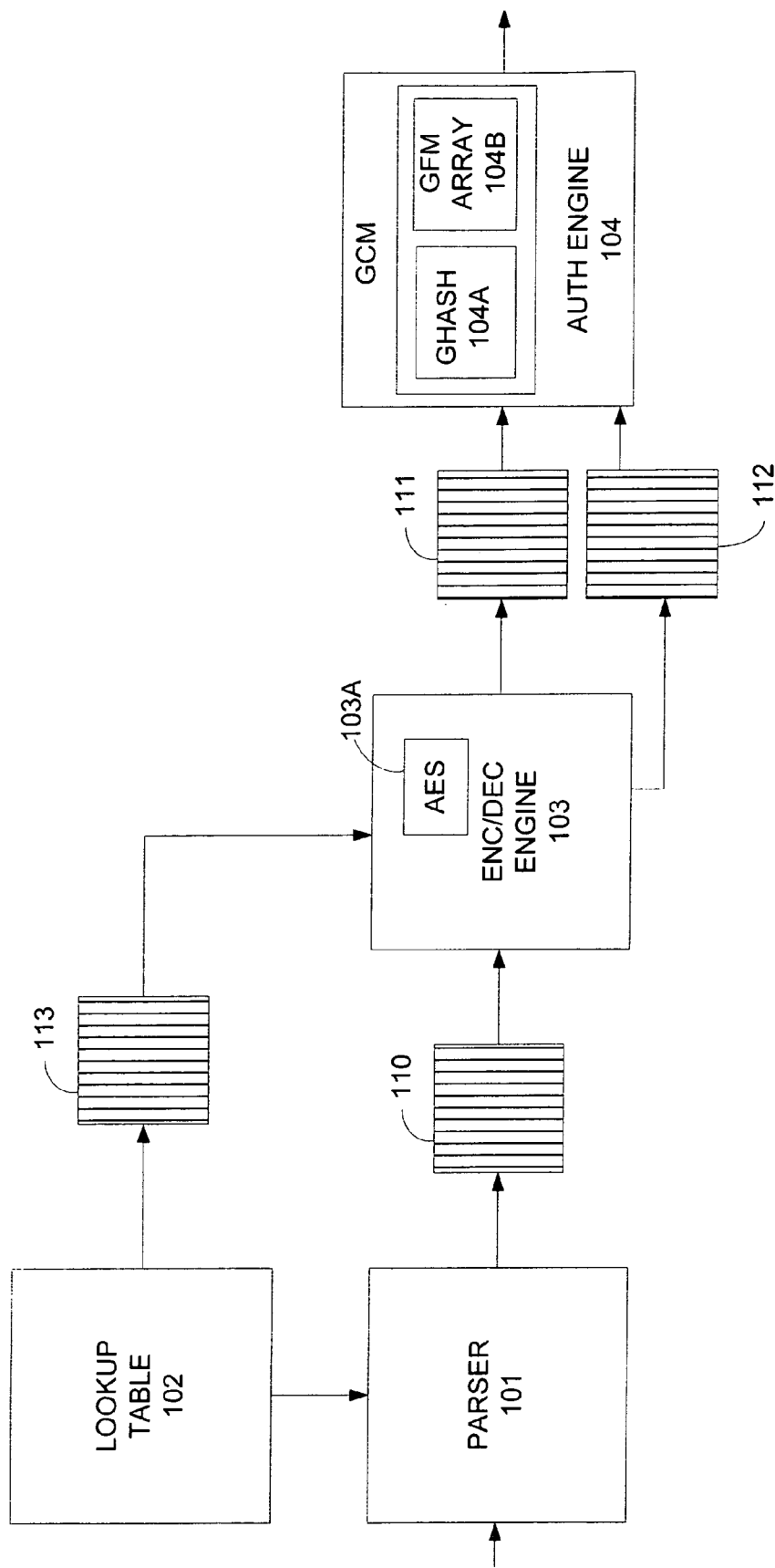
FIG. 1 is a block diagram of one embodiment of a MACSec entity.

A low-power implementation of a MACSec entity is described. In one embodiment, the MACSec entity is partitioned into multiple power domains that operate relatively independently, such that their power consumption can be independently managed (e.g., their clocks turned on and off). Their independent operation corresponds to each domain's ability to process a different set of packets or parts of packets simultaneously. When a particular power domain doesn't have any data available to process, it is not in use. When not in use, the power domain enters a reduced power consumption mode. Upon notification of data availability from a neighboring power domain, the power domain exits the reduced power consumption state (i.e., wakes up from low-power mode) and proceeds to process the data. Upon completion of processing, a power domain can choose to enter the low-power mode.

Other techniques are described to further reduce the power consumption of the MACSec entity. These will be described in more detail below.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these, systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A MACSec entity that enters and exits a reduced power consumption state is disclosed. The MACSec entity comprises multiple discrete elements coupled together to perform MAC security processing. That is, MAC security processing of the MACSec entity is divided among discrete elements. In one embodiment, the discrete elements comprise a parser, a look up table coupled to the parser, an encryption/decryption engine coupled to receive packets from the parser, and an authentication engine coupled to receive packets from the encryption/decryption engine. In one embodiment, the discrete elements operate on distinct packets or parts of packets related to MAC security simultaneously.

FIG. 1 illustrates one embodiment of a MACSec entity. Referring to FIG. 1, the MACSec entity comprises a parser 101, a look-up table 102, an encryption/decryption engine 103, and authentication engine 104. In one embodiment, encryption/decryption engine 103 includes a AES engine, and authentication engine 104 includes a G-hash unit.

In one embodiment, encryption/decryption engine 103 and authentication engine 104 operate together to perform a Galois Counter Mode (GCM) algorithm to provide an authenticated encryption output that adheres to the 802.1AE standard and its variants. More specifically, the GCM is a block cipher in counter mode together with Galois Field-based authentication. To that end, encryption/decryption engine 103 performs an AES counter mode cipher to provide encryption, and authentication engine 104 uses a binary Galois Field Multiplier (GFM) for authentication. Authentication engine 104 also includes a comparator to compare a hash value of the packet to a calculated valued as part of the decryption process and an insertion unit to insert the calculated value into the packet as part of the encryption process. These functions are well-known in the art and have been implemented in well-known ways, except where explicitly set forth herein.

In embodiment, each element is in an independently controlled power domain that enters a reduced power consumption state independently of other discrete elements when not in use. If a given element is not processing data, that given element shuts its clock off to save power. In other words, individual elements are able to enter a reduced power consumption, or low power, state when not processing data.

Figure 5:
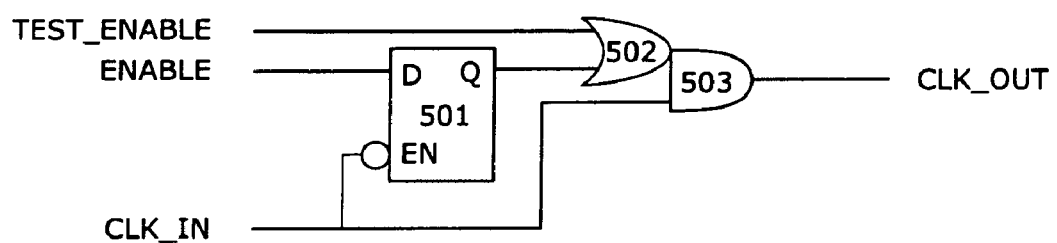
FIG. 5 illustrates one embodiment of clock gating logic.

In one embodiment, the individual elements enter the lower power state using clock gating in a manner that is well-known in the art. FIG. 5 illustrates one embodiment of clock gating logic. Referring to FIG. 5, the clock gate logic includes a D latch 501, an OR gate 502, and an AND gate 503. D latch 501 has a D input coupled to an Enable signal. The clock signal CLK_IN is used to clock the operation of a unit (or drive its clock) in the MACSec entity and is coupled to an inverted enable (EN) input of D latch 501. The Q output of D latch 501 is coupled to one input of OR gate 502. The other input of OR gate 502 is coupled to a Test_enable signal. The Test_enable signal is normally active low, except during test mode. The output of OR gate 502 is coupled to one input of AND gate 503. The CLK_IN signal is coupled to the other input of AND gate 503. The output of AND gate 503 is the CLK_OUT signal, which is used to clock a unit in the MACSec entity.

When operating, the Test_enable and Enable signals control whether the clock is gated. Since the Test_enable signal is only used during test, the Enable signal controls whether the clock is gated during operation of the MACSec entity. As long as the Enable signal is asserted, the clock is not gated. If the unit is to enter a reduced power consumption state, the Enable signal is brought low.

As shown in FIG. 1, encryption/decryption engine 103 includes an AES engine 103A to form cryptographic primitives. In one embodiment, AES engine 103A is only used roughly 75% of the time, even if encryption/decryption engine 103 is running 100% of the time. In one embodiment, because AES engine 103A is an independent entity, AES engine 103A enters a reduced power consumption state when not in use. Thus, the clock of AES engine 103A is gated as the encryption process is proceeding. This results in additional power savings.

In one embodiment, look-up table 102, which is separate from the rest of the data path through the MACSec entity is utilized less often. In fact, its usage may be only 5 percent of the time. Thus, in one embodiment, look-up table 102 enters a low-power state when it is not being used even while the MACSec entity is processing packets.

In one embodiment, to facilitate entering and exiting low power state, a controlling entity in each element is used. In one embodiment, each of the discrete elements includes control logic or a corresponding control element to turn on and off the clocks to at least one discrete element. The control logic may comprise or control clock gating logic.

In another embodiment, each of the discrete elements has a corresponding control element containing a controlling entity to turn on and off the clocks to the discrete element.

The control logic or control element may be located internally within the element or external to the element. Thus, elements may put themselves into the reduced power consumption state or have an external controller to perform that function.

In one embodiment, the clock gating logic is at the register bank level.

In another embodiment, other internal and external circuitry and/or logic may be used to cause discrete elements to enter the reduced power consumption state.

The controlling logic for an element knows when data is needed and causes the element to enter or exit the low power state by turning on or off the clocks accordingly. Each of the elements has the number of input lines to indicate when incoming data is available. Each of the elements also includes idle logic to indicate when a completion of processing has occurred in a particular packet. The idle logic produces an idle indication that indicates it is idle and is able to cause the element to enter into the low-power state, at which point the clock is turned off.

Each element receives another indication on an input, which is used to indicate data availability. In one embodiment, a notification (e.g., a signal, register bit set, etc.) is used to indicate data availability from an adjacent element. In one embodiment, at least one of discrete elements exits the reduced power consumption state in response to receiving a notification from another of the discrete elements indicating that more data is available to be processed by that discrete element as part of the MAC security processing. That is, in response to receiving this notification, the element exits low-power state, at which point the element's clock is turned back on.

Thus, by partitioning of a MACSec design into multiple dynamic power domains, the power domains may be controlled independently, which, in one embodiment, is done by turning on and turn off of clocks in the power domains (PD).

Buffering

In one embodiment, elements in the MACSec entity run independently of each other. Each of the units may be working on different packets or parts of packets at the same time. Insertion of localized buffers to match processing rate or processing latency of elements prevents stalling of units that run at different peak rates. More specifically, in one embodiment, parser 101 and encryption/decryption engine 103 process data (e.g., packets) at different peak rates or latencies. In order to compensate for these different peak rates or latencies, a buffer is coupled between parser 101 and encryption/decryption engine 103. Referring to FIG. 1, buffers 110 interface parser 101 to encryption/decryption engine 103 to compensate for their different peak rates of packet processing.

Similarly, in one embodiment, encryption/decryption engine 103 and authentication engine 104 process data at different peak rates. In order to compensate for the different peak rates, at least one buffer is coupled between encryption/decryption engine 103 and authentication engine 104. This allows encryption/decryption engine 103 to be working on one piece of data while authentication engine 104 works on another piece of data. In one embodiment, dual buffers are used. Buffer 111 contains packet data being output from encryption/decryption engine 103 that is to be processed by authentication engine 104. While buffer 112 contains the information upon which the G-hash block of authentication engine 104 is going to perform calculations. The two buffers are needed because the packet data in buffer 111 and buffers 112 are consumed at different peak rates and with different latencies.

The buffering, including buffers 110-112, allows the elements to work on different packets or different parts of the same packet along as there is enough buffering between the respective elements. Thus, each of the elements work independently of each other and works on different packets or different parts of the same packet concurrently.

Figure 7A:
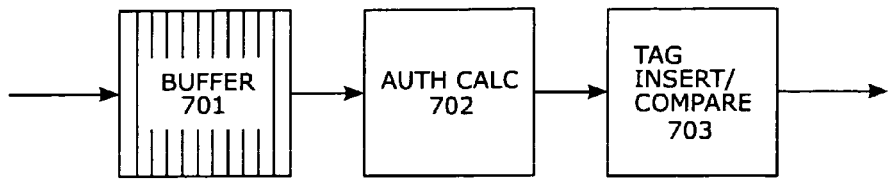
FIG. 7A is a block diagram of an authentication calculation and tag insert/compare unit.

FIG. 7A is a block diagram of an authentication calculation and tag insert/compare unit. Referring to FIG. 7A, buffer 701, authentication calculation unit 702 and tag insert/compare unit 703 are coupled in series such that buffer 701 receives data to be processed and sends it to authentication calculation unit 702. The authentication calculation 702 calculates a value, which tag insert/compare unit 703 compares to the hash value of a packet during the decryption process. The authentication calculation and tag insert/compare operations associated with the MAC security operation specified as part of MACSec protocols referenced in the background are well-known in the art.

Figure 7B:
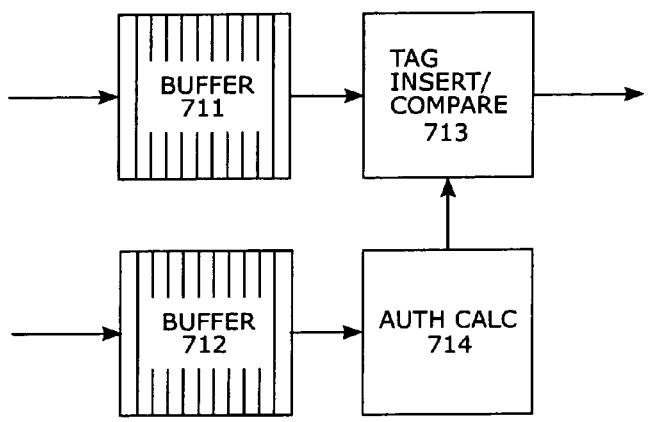
FIG. 7B is a block diagram of one embodiment of an authentication calculation and tag insert/compare unit that uses parallel buffers.
Figure 7C:
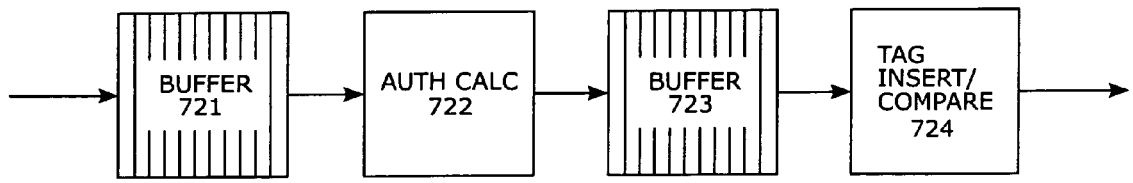
FIG. 7C is a block diagram of an authentication calculation and tag insert/compare unit that uses sequential buffering.

By providing additional buffering, tag insert/compare unit 713 and the authentication calculation unit 714 may operate with different processing latencies. Such an implementation enables tag insert/compare unit 713 and the authentication calculation unit 714 to operate at a lower frequency while maintaining the desired processing throughput. FIG. 7B is a block diagram of one embodiment of an authentication calculation and tag insert/compare unit that uses parallel buffers. Referring to FIG. 7B, parallel buffers 711 and 712 are shown coupled to provide data to the tag insert/compare unit 713 and the authentication calculation unit 714 in parallel. FIG. 7C is a block diagram of an authentication calculation and tag insert/compare unit that uses sequential buffering. Referring to FIG. 7C, buffer 721, authentication calculation unit 722, buffer 723, and tag insert/compare unit 724 are coupled in series such that buffer 711 receives data to be processed and sends it to authentication calculation unit 722. The authentication calculation 722 calculates a value which is stored in buffer 723 until tag insert/compare unit 703 compares it to the hash value of a packet during the decryption process. Therefore, the increased buffering enables these units to be run at lower frequencies, thereby saving power.

Low Frequency Operation to Reduce Power Consumption

In one embodiment, the MACSec entity reduces dynamic power dissipation by operating at a lower frequency. To fulfill the throughput requirements, the data path is increased in width to compensate to the lower operating frequency. In one embodiment, parallelism is used to reduce the clock frequency. The parallelism is obtained through the use of wider data paths, such as 8, 16, 32, 64, to reduce the clock frequency. The effect of the increase in the width of the datapath is an increase in the amount of silicon area necessary for the datapath. To reduce the impact of the increase in datapath area, high-Vt, high-density cells are used to reduce the size and reduce the power consumption. The effect of using these cells is that the area necessary to support the increased datapath size is close to the size of the original narrower datapath.

One benefit of such an approach is that the AES engine may run intentionally slower than the native frequency. This reduces power consumption at the expense of the area necessary to have more stages. In one embodiment, the area increase is slightly less than linear while the power reduction is linear.

Figure 2:
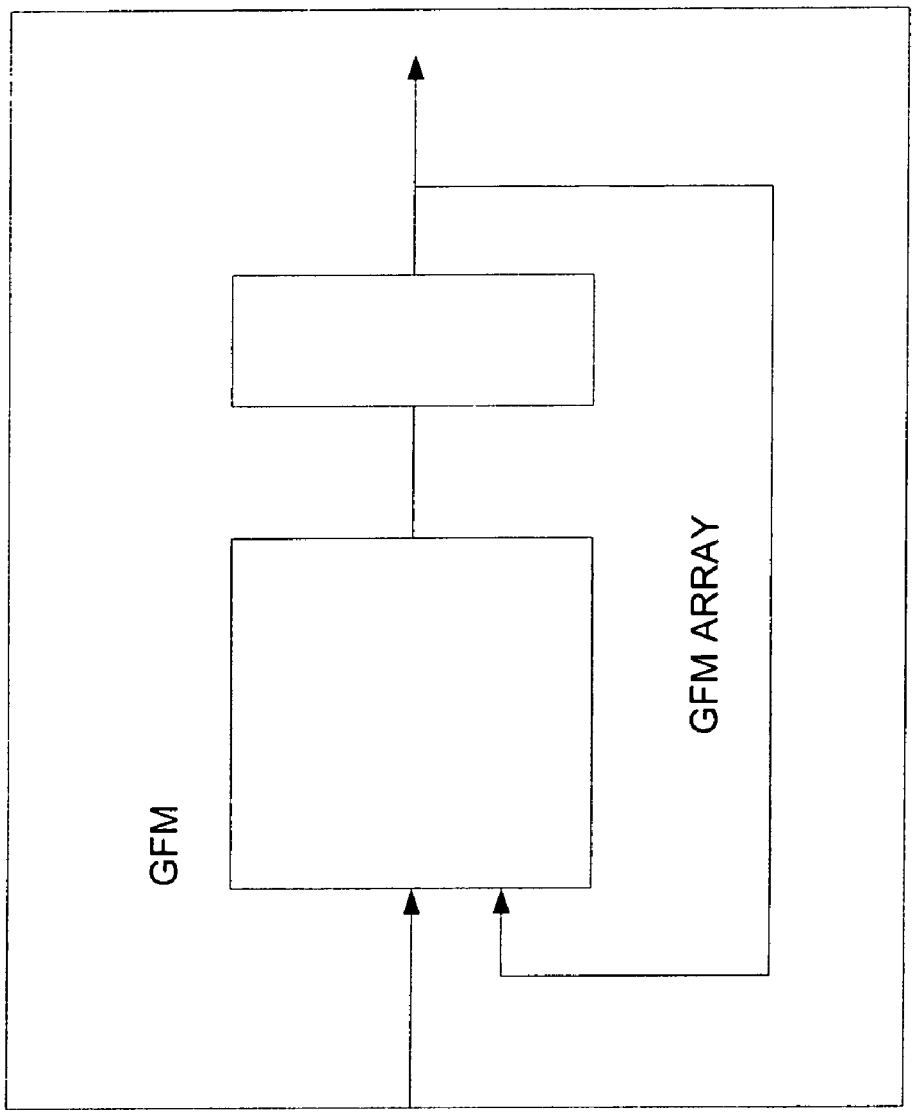
FIG. 2 is a general block diagram of the authentication engine including the GFM array.

The use of wider data paths to reduce clock frequency is not limited to the AES engine. Therefore, the same technique may be used in other areas to reduce power consumption. Authentication engine 104 includes the G-hash unit 104A. G-hash unit 104A includes a Galois field multiplier (GFM). FIG. 2 illustrates an example of the authentication engine including the GFM and the GFM array. In one embodiment, the GFM array may be implemented with a custom cell. In one embodiment, the G-hash function may be broken into stages, the results of which may be combined. More specifically, the G-hash function and the authentication engine perform a 128 bit by 128 bit multiply. This may be done at 8 bits at a time, 16 bits at a time, 32 bits at a time, or 64 bits at a time. In such a case, the multiplier that is used is a different width.

Note that in certain areas such as the parser and the look-up table of FIG. 1, a wider data path may not be advantageous. In the case of the look-up table, it is not useful because of the amount of time that the look-up table is turned off. It may not be advantageous to use in the parser where doing so would make the parser exponentially harder to implement.

High/Multi Vt (LPR)

In one embodiment, one or more of the discrete elements are implemented with low-leakage cells. The low leakage cells may comprise high-Vt cells. In one embodiment, all elements shown in FIG. 1 are comprised either entirely of high-Vt cells or of a mixture of high and low Vt cells. Power consumption is reduced by using the low-leakage cells (e.g., high Vt cells). Also, high-Vt cells are typically smaller than their low-Vt equivalents. This helps reduce the size of an implementation, and helps compensate for the doubling of the data path. Normally high-Vt cells are not used in such applications. However, in the case where the data path has been doubled, high-Vt cells may be used to reduce the amount of area that is lost due to the doubling of the data path. Although these cells are slower, deep pipelining is used to reduce the logic levels in the pipe stage.

To reduce leakage power, the MACSec entity also uses excess pipelining stages in one or more elements or power domains, such that the designed can be implemented with lower-leakage cells, which are operate slower than other cells that might be used. In one embodiment, at least one of the discrete elements is deeply pipelined.

Figure 3:
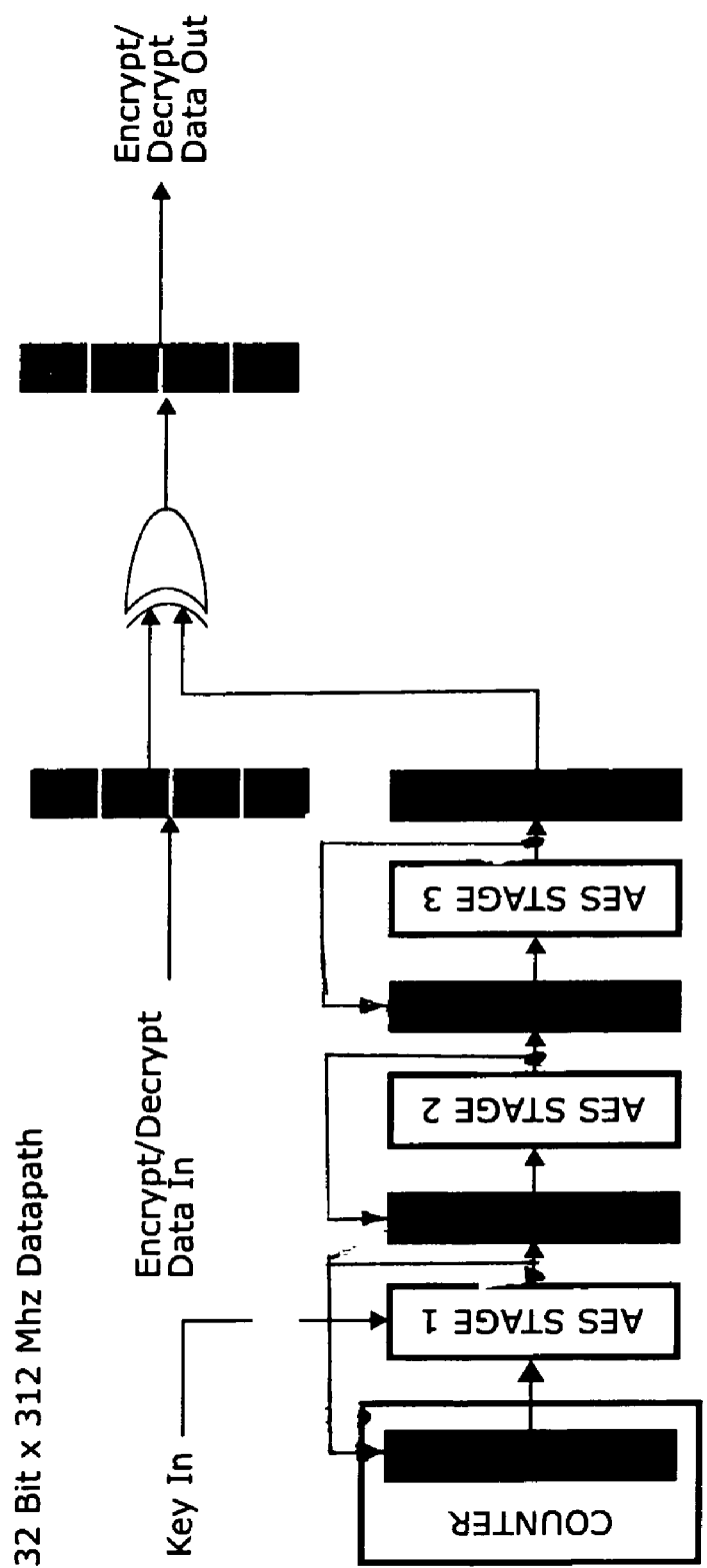
FIG. 3 is a prior art implementation of an AES engine.

FIG. 3 is a prior art pipelined implementation of an AES engine. Referring to FIG. 3, the AES logic includes three AES stages with the first stage receiving both a count from the counter and a Key In. The output from the last AES stage is coupled to one input of an XOR gate. The other input of the XOR gate is coupled to the output of a 32-bit datapath transferring the encrypt/decrypt data in. The output of the XOR is a 32-bit datapath that is output from the encryption/decryption engine.

Figure 4:
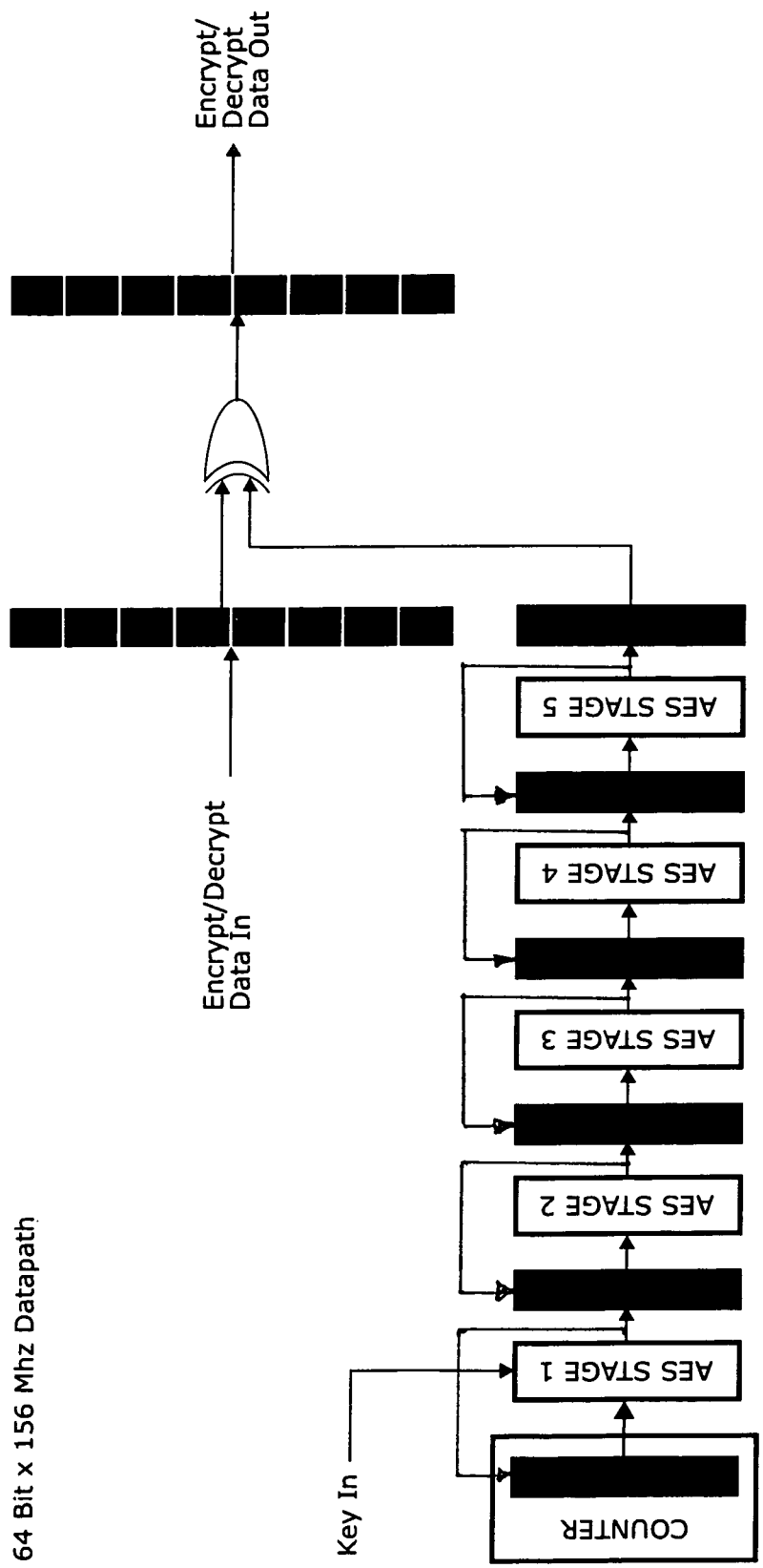
FIG. 4 is one embodiment of a highly pipelined implementation of an AES engine.

FIG. 4 is one embodiment of a highly pipelined implementation of an AES engine. Referring to FIG. 4, the AES logic includes five AES stages with the first stage receiving both a count from the counter and a Key In. The output from the last AES stage is coupled to one input of an XOR gate. The other input of the XOR gate is coupled to the output of a 64-bit datapath transferring the encrypt/decrypt data in. The output of the XOR is a 64-bit datapath that is output from the encryption/decryption engine.

Transition Propagation Minimization

To reduce the dynamic power consumption due to transition propagation combination optimizations are used to reduce the quantity of propagation and corresponding power consumption. In one embodiment, the AES S-boxes are implemented without XOR gates Other combinational optimizations to restrict the transition propagation in a MACSec entity may be used, such as, for example, AND-XOR cascades.

Examples of System Implementations

Figure 6:
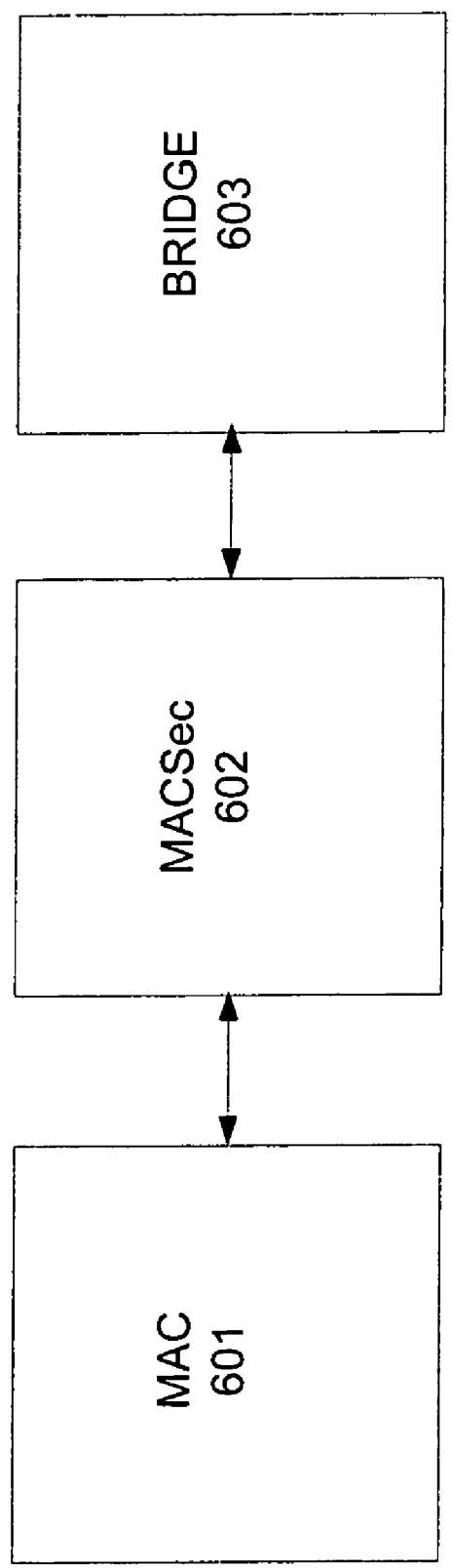
FIG. 6 is a block diagram of one embodiment of a portion of a system.

FIG. 6 is a block diagram of one embodiment of a portion of a system. Referring to FIG. 6, the system comprises a MAC, a MAC security (MACSec) entity, and a bridge. MAC 601 and MACSec entity 602 may be part of a network interface card (NIC). Bridge 603 may be a south bridge in a computer system. Bridge 603 may be replaced with other components of a computer system, such that MAC 601 and MACSec entity 602 are coupled to another component.

In one embodiment, MACSec entity 602 operates at an integer multiple of operating frequencies of MAC 601 and bridge 603. In one embodiment, MACSec entity 602 runs at the same native clock frequencies of MAC 601 and bridge 603 to avoid the need for synchronization FIFO's between the MACSec and the bridge. In one embodiment, MACSec entity 602 operates on 125 Mhz, 156.25 Mhz and/or 312.5 Mhz.

Thus, the use of wider data paths (e.g., 8, 16, 32, 64) in portions of a MACSec entity helps reduce the clock frequency needed to meet throughout requests, and thus results in reduces power consumption.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
   a media access control (MAC) entity including a plurality of discrete elements coupled together to perform MAC security processing, the plurality of discrete elements configured to simultaneously operate on distinct packets related to MAC security,
   wherein each of the plurality of discrete elements is in an independently controlled power domain that, when not in use, enters a reduced power consumption state independently of other discrete elements of the plurality of discrete elements,
   wherein the plurality of discrete elements includes an encryption/decryption engine,
   wherein the encryption/decryption engine comprises an Advanced Encryption Standard (AES) engine, and
   wherein the AES engine enters a reduced power consumption state for a period of time when the encryption/decryption engine is performing encryption on the distinct packets related to MAC security.

2. The apparatus defined in claim 1, wherein the plurality of discrete elements comprise:
   a parser having a parser output;
   a look up table coupled to the parser; and
   an authentication engine coupled to receive packets from the encryption/decryption engine, wherein the encryption/decryption engine is coupled to receive packets from the parser output.

3. The apparatus defined in claim 2, wherein:
   the parser and the encryption/decryption engine process data at different rates; and
   the apparatus further comprises a buffer coupled between the parser and the encryption/decryption engine, the buffer to compensate for the different rates.

4. The apparatus defined in claim 2, wherein:
   the encryption/decryption engine and the authentication engine process data at different rates; and
   the apparatus further comprises at least one buffer coupled between the encryption/decryption engine and the authentication engine, the at least one buffer to compensate for the different rates.

5. The apparatus defined in claim 4, wherein the authentication engine comprises Galois field multiplier (GFM), and wherein the at least one buffer comprises:
 a first buffer for data for a G-hash unit to process; and
 a second buffer for data to be used by a tag comparison/insertion unit.

6. The apparatus defined in claim 1, further comprising control logic for at least one of the plurality of discrete elements, the control logic to turn on and off a clock to the at least one discrete element.

7. The apparatus defined in claim 6, wherein the control logic comprises clock gating logic.

8. The apparatus defined in claim 1, wherein at least one of the plurality of discrete elements exits the reduced power consumption state in response to:
 a notification from another of the plurality of discrete elements indicating that another packet is available to be processed by the at least one discrete element as part of the MAC security processing.

9. The apparatus defined in claim 1, wherein at least one of the plurality of discrete elements has a wider datapath.

10. The apparatus defined in claim 1, wherein one or more of the discrete elements are implemented with low-leakage cells.

11. The apparatus defined in claim 10, wherein the low-leakage cells comprise high-Vt cells.

12. The apparatus defined in claim 11, wherein at least one of the discrete elements includes 5 pipeline stages.

13. A system comprising:
 the apparatus defined in claim 1; and
 a bridge coupled to the MAC entity.

14. The system defined in claim 13, wherein the MAC entity operates at an integer multiple of an operating frequency of the bridge.

15. The system defined in claim 13, wherein the plurality of discrete elements comprise:
 a parser having a parser output;
 a look up table coupled to the parser;
 an authentication engine coupled to receive packets from the encryption/decryption engine, wherein the encryption/decryption engine is coupled to receive packets from the parser output.

16. The system defined in claim 13, further comprising control logic for at least one of the plurality of discrete elements, the control logic to turn on and off a clock to the at least one discrete element.

17. The system defined in claim 16, wherein the control logic comprises clock gating logic.

18. An apparatus comprising:
 a media access control (MAC) entity including a plurality of discrete elements coupled together to perform MAC security processing, the plurality of discrete elements configured to simultaneously operate on distinct packets related to MAC security,
 wherein each of the plurality of discrete elements is in an independently controlled power domain that, when not in use, enters a reduced power consumption state independently of other discrete elements of the plurality of discrete elements,
 wherein the plurality of discrete elements comprise:
  a parser having a parser output;
  a look up table coupled to the parser;
  an encryption/decryption engine coupled to receive packets from the parser output;
  an authentication engine coupled to receive packets from the encryption/decryption engine; and
  a buffer coupled between the parser and the encryption/decryption engine,
  wherein the parser and the encryption/decryption engine process data at different rates, and the buffer compensates for the different rates.

19. An apparatus comprising:
 a media access control (MAC) entity including a plurality of discrete elements coupled together to perform MAC security processing, the plurality of discrete elements configured to simultaneously operate on distinct packets related to MAC security,
 wherein each of the plurality of discrete elements is in an independently controlled power domain that, when not in use, enters a reduced power consumption state independently of other discrete elements in the plurality of discrete elements,
 wherein the plurality of discrete elements comprise:
  a parser having a parser output;
  a look up table coupled to the parser;
  an encryption/decryption engine coupled to receive packets from the parser output; and
  an authentication engine coupled to receive packets from the encryption/decryption engine; and
  at least one buffer coupled between the encryption/decryption engine and the authentication engine, and
  wherein the encryption/decryption engine and authentication engine process data at different rates, and the at least one buffer compensates for the different rates.

* * * * *